United States Patent [19]

Blease

[11] 4,079,957
[45] Mar. 21, 1978

[54] CONVERTIBLE TRICYCLE

[75] Inventor: Wilfred J. Blease, Greenville, N.H.

[73] Assignee: Pioneer Plastics, Inc., Greenville, N.H.

[21] Appl. No.: 752,416

[22] Filed: Dec. 20, 1976

[51] Int. Cl.[2] ............................ B62K 5/02; B62K 9/02
[52] U.S. Cl. .................................... 280/278; 280/279; 280/282; 280/7.15
[58] Field of Search ................ 280/278, 279, 274, 7.1, 280/7.15, 281 R, 282, 87.02 R, 87.05; D12/112

[56] References Cited
U.S. PATENT DOCUMENTS

| | | | |
|---|---|---|---|
| 1,443,130 | 1/1923 | Hilpert | 280/7.1 |
| 2,859,979 | 11/1958 | Himes | 280/279 |
| 3,039,791 | 6/1962 | Horowitz | 280/259 |
| 3,827,719 | 8/1974 | Lohr | 280/282 X |

OTHER PUBLICATIONS

Mechanix Illustrated Magazine; vol. 47, No. 6; Oct. 1964; p. 133.
Marx Toys Catalog; Jan. 1, 1973; p. 30; (illustrations 5014 and 5077).
Marx Toys Catalog; Jan. 1, 1973; p. 6; (illustration 5080).

Primary Examiner—Kenneth H. Betts

[57] ABSTRACT

A child's convertible pedal tricycle readily assembled into upright and underslung configurations is disclosed. It has an integral plastic frame member with upright and underslung seating walls on opposite sides, a pair of rear wheels on its rear end, a front fork member removably, reversibly and rotatably mounted on its front end with a pedal driven front wheel on its lower end and a handlebar member removably mounted on its upper end for easy convertibility into either configuration whenever desired.

14 Claims, 9 Drawing Figures

CONVERTIBLE TRICYCLE

BACKGROUND OF THE INVENTION

This invention relates to children's pedal tricycles, and more particularly to tricycles which a child may readily assemble either into upright or underslung configurations.

A child's convertible vehicle of the push type is disclosed in U.S. Pat. No. 1,379,305 in which the vehicle is changeable from an upright tricycle configuration on which the child sits, to a lowered scooter configuration on which the child stands. However, the vehicle of that patent would not be usable as a pedal vehicle when the vehicle is in lowered configuration.

SUMMARY OF THE INVENTION

It is a major object of the present invention to provide a child's convertible pedal tricycle which can be readily assembled by a child into either upright or underslung configurations.

It is another object of the invention to provide a child's convertible pedal tricycle of molded plastic construction which is simple, easy-to-assemble, sturdy, reliable and inexpensive.

In order to accomplish these objects, the invention provides a child's convertible pedal tricycle having an integral frame member, preferably of hollow plastic construction, with a transversely narrow front portion and a transversely wide rear portion, longitudinally spaced from the front portion and in rigid and fixed angular relation thereto, preferably at an obtuse angle in elevation. A pair of rear wheels are rotatably mounted on opposite sides of the rear end of the rear portion. A front fork member is removably, reversibly and rotatably mounted on the frame member with a pedal driven front wheel rotatably mounted on the lower end thereof. A handlebar member is removably mounted on the upper end of the fork member. The frame member has on its one side a longitudinally and transversely extending upright configuration seating surface or wall and on its other side a longitudinally and transversely extending underslung configuration seating surface or wall, the seating surfaces or walls being spaced from one another and preferably connected by integral sidewalls.

In a major aspect of the invention, for removably mounting of the fork member, the seating walls adjacent their forward ends have opposed concentric circular bearing openings, preferably located such that the fork member is generally perpendicular to the front portion of the frame member in both configurations. The fork member preferably has an upper cylindrical portion receivable within the bearing openings, an outwardly extending flange beneath the cylindrical portion for supporting the lower of the seating walls of the frame member, and a projection extending beyond the cylindrical portion. The handlebar member preferably has a central opening for receiving the fork member projection. A fastener may be provided for securing the fork member to the handlebar member overlying the upper of the seating surfaces of the frame member to interpose the frame member between it and the flange on the fork member. Preferably, too, the handlebar grips are generally perpendicular to the fork member in both configurations.

For the purpose of more fully explaining the above and still further features of the invention, reference is now made to the following detailed description of a preferred embodiment thereof, together with the accompanying drawings.

DETAILED DESCRIPTION

Figure 1:
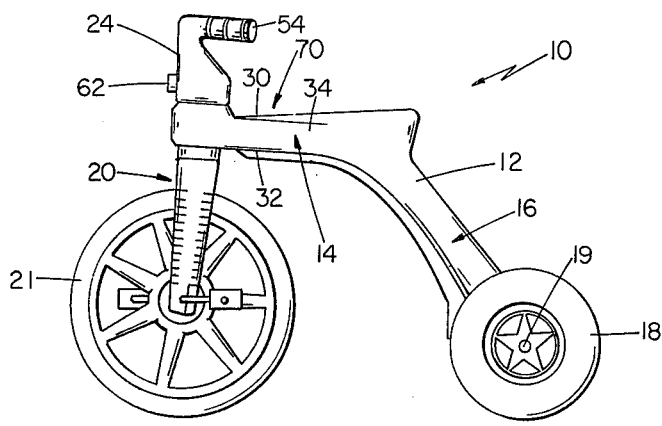
FIGS. 1 and 2 are, respectively, side and top views of the pedal tricycle of the invention assembled in upright configuration.
Figure 2:
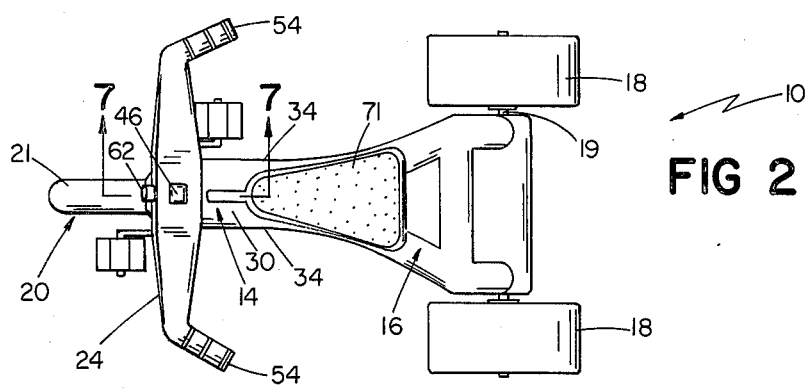
Figure 3:
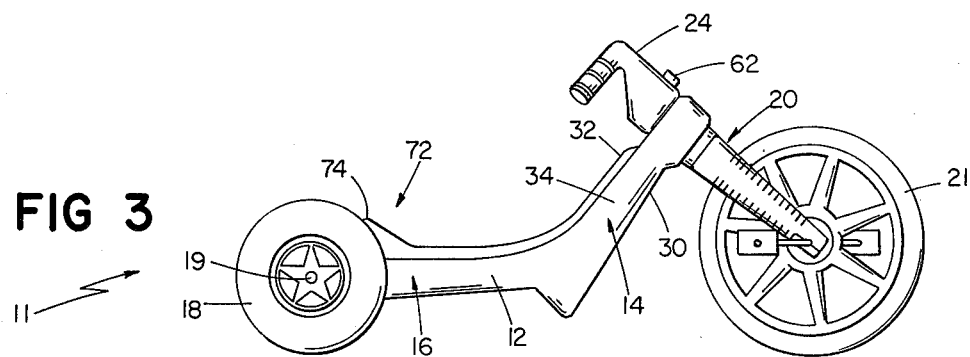
FIGS. 3 and 4 are, respectively, side and top views of the pedal tricycle of the invention assembled in underslung configuration.
Figure 4:
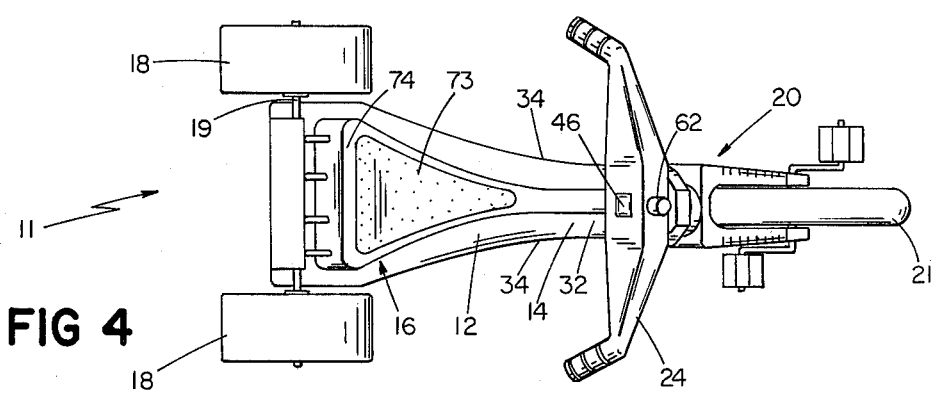
Figure 5:
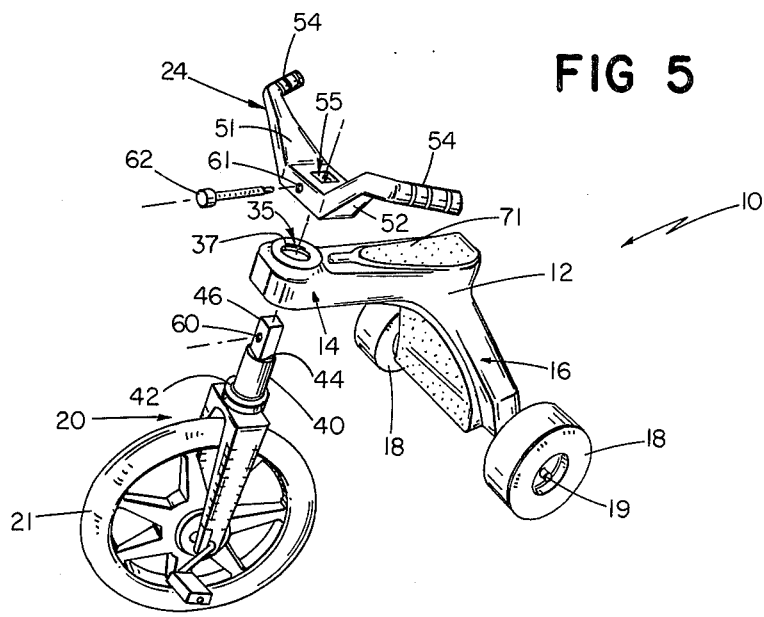
FIGS. 5 and 6 are perspective views, partially exploded, of the pedal tricycle of the invention assembled, respectively, in upright and underslung configuration.
Figure 6:
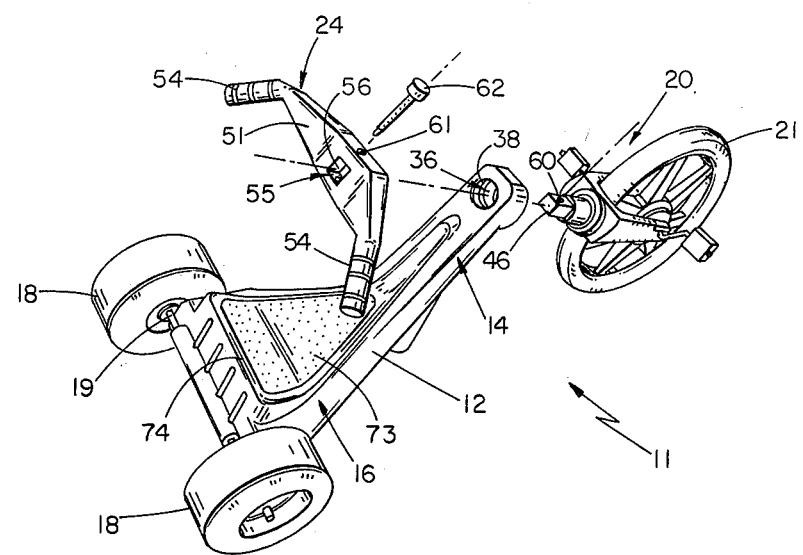

Referring to the drawings, in FIGS. 1, 2 and 5 is shown the child's convertible pedal tricycle of the invention assembled in upright configuration, generally designated 10, and in FIGS. 3, 4 and 6 is shown the tricycle of the invention assembled in underslung configuration, generally designated 11. The identical elements are utilized for assembly in each configuration, and may be readily disassembled and assembled in the other configuration whenever desired. These elements include integral hollow plastic frame member 12 having rear wheels 18 permanently mounted thereon; a front fork member 20, having a pedal driven permanently mounted front wheel 21, removably, reversibly and rotatably mounted adjacent the forward end of frame member 12; and an integral hollow plastic handlebar member 24 removably mounted on the upper end of fork member 20 with a fastener 62.

More specifically, frame member 12 has a transversely narrow front portion 14 and a transversely wide rear portion 16 which are at a fixed obtuse angle in elevation. A pair of rear wheels 18 are rotatably mounted on steel axle 19 on opposite sides of the rear end of rear portion 16. Frame member 12 has an upright configuration seating wall 30 and an underslung configuration seating wall 32 which are connected by integral sidewalls 34. Forward portion 70 of upright configuration seating wall 30 is generally horizontal in the upright configuration of the assembled tricycle as best shown in FIG. 1 and has an integral saddle 71, as best shown in FIG. 2. The back portion 72 of underslung configuration seating wall 32 is generally horizontal in the underslung configuration of the assembled tricycle as best shown in FIG. 3 and has an integral seat 73 with an upturned rear edge 74 as best shown in FIG. 4.

Figure 7:
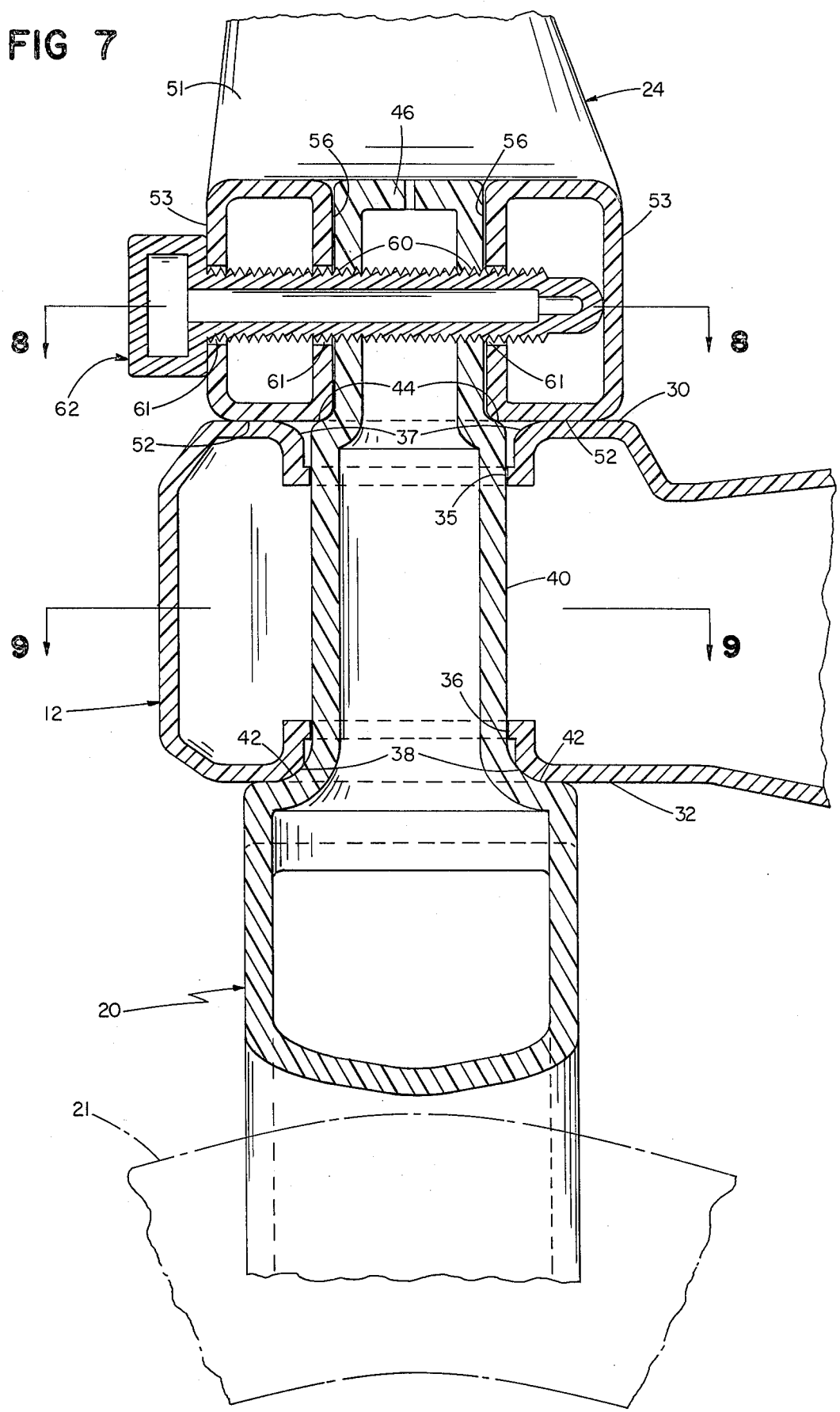
FIG. 7 is a detailed side sectional view taken along line 7—7 of FIG. 2 showing the assembly of the fork member and handlebar member with the frame member.

The seating walls 30 and 32 have, adjacent their forward ends, opposed concentric circular bearing openings 35 and 36 defined by inturned curved flanges 37 and 38, as best shown in FIGS. 5, 6 and 7.

As best shown in FIG. 7, fork member 20 has an upper cylindrical portion 40 receivable within bearing openings 35 and 36, an outwardly extending flange 42 beneath cylindrical portion 40 for supporting the lower of seating walls 30 or 32, a handlebar support surface 44 at the upper end of cylindrical portion 40, and a projection 46 of square cross-section, no greater in maximum cross sectional dimension than the diameter of cylindrical portion 40, extending upwardly from handlebar support surface 44.

Integral hollow plastic handlebar member 24 has upper and lower walls 51 and 52 connected by integral sidewalls 53 and integral handlebar grips 54. It has a square central opening 55 including an integral, inwardly extending flange 56, for receiving fork projection 46, which is of cooperating angular cross-section.

Figure 8:
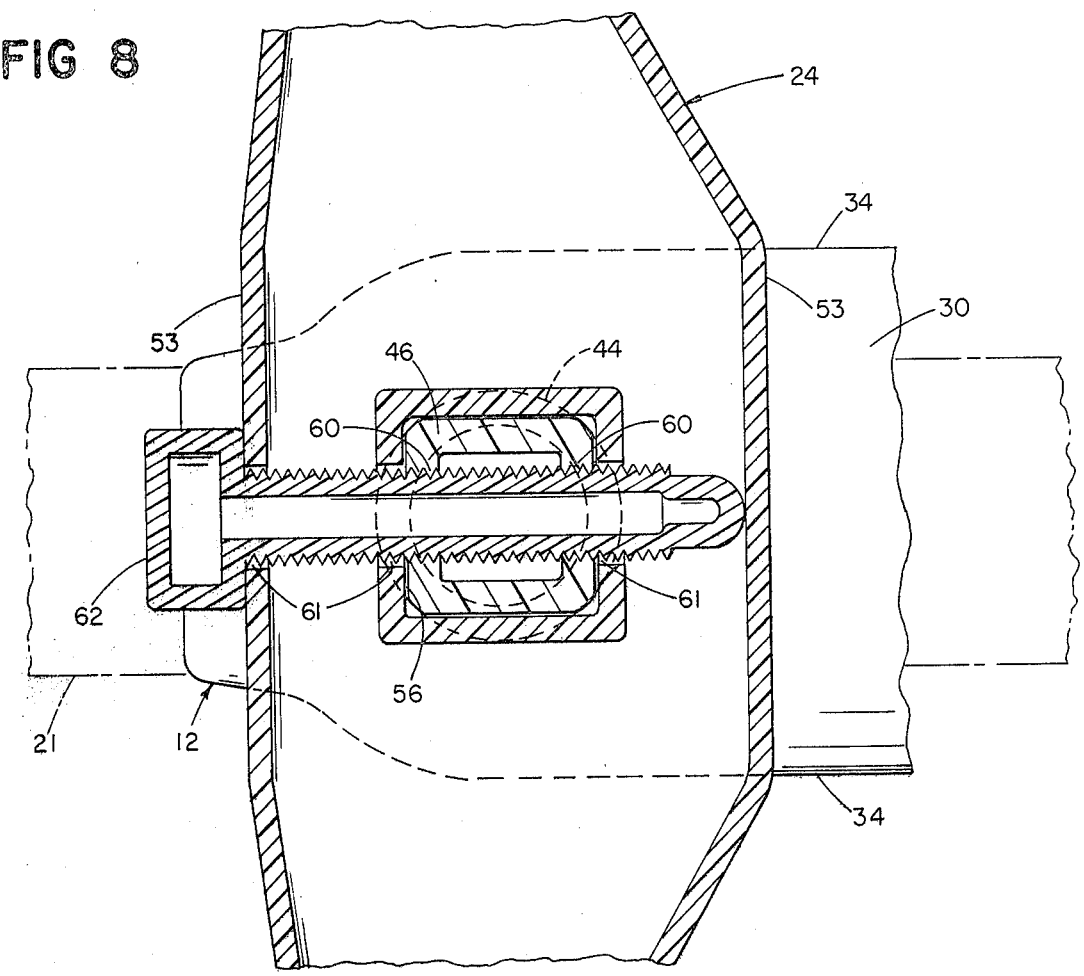
FIGS. 8 and 9 are detailed cross sectional views taken, respectively along lines 8—8 and 9—9 of FIG. 7.
Figure 9:
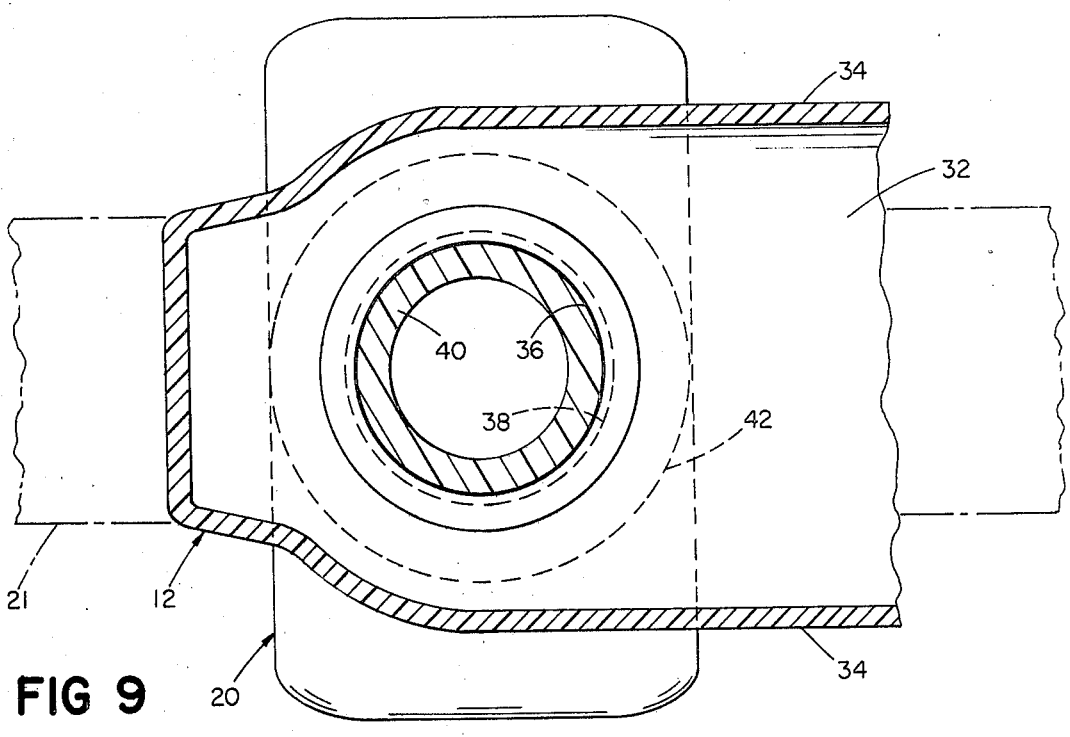

Fork projection 46 has a threaded perpendicular fastener opening 60, and handlebar member 24 has a cooperating fastener opening 61. Threaded fastener 62 extends through handlebar member opening 61 and fork member projection opening 60, as shown in FIGS. 7 and 8, securing handlebar member 24 to projection 46 to interpose frame member 12 between flange 42 and handlebar member 24, as best shown in FIG. 7.

The axis of concentric bearing openings 35 and 36 is substantially perpendicular to front portion 14 of frame member 12. Fork member 20 is thus substantially perpendicular to front portion 14 of frame member 12 in both operating configurations, and is therefore generally perpendicular to the ground in the upright configuration as best shown in FIG. 1 and inclined at an acute angle with respect to the ground in the underslung configuration as best shown in FIG. 3. Integral handlebar grips 54 are substantially perpendicular to fork member 20, and therefore grips 54 are substantially parallel to front portion 14 of frame member 12 in both operating configurations as best shown in FIGS. 1 and 3. The change in the angle of inclination of fork member 20 with respect to the ground orients front wheel 21 and handlebar grips 54 with respect to the rider for easy pedaling and steering in both operating configurations.

To change the operating mode of the tricycle from the upright configuration 10 to the underslung configuration 11, fastener 62 is removed and handlebar member 24 and frame member 12 are lifted off fork member 20. Frame member 12 is inverted and replaced on the fork member 20 with the upright seating wall 30 facing downwardly and resting on fork flange 42, and the underslung seating wall 32 facing upwardly. Handlebar member 24 is replaced on projection 46 and secured thereto by fastener 62.

What is claimed is:

1. A child's convertible pedal tricycle readily assembled into upright and underslung configurations, comprising
   an integral hollow plastic frame member with
   a transversely narrow front portion and
   a transversely wide rear portion longitudinally spaced from said front portion and in rigid and fixed angular relation thereto and having a pair of rear wheels rotatably mounted on opposite sides of the rear end of said rear portion,
   a front fork member removably, reversibly and rotatably mounted on said frame member with a pedal driven front wheel rotatably mounted on the lower end thereof and
   a handlebar member removably mounted on the upper end of said fork member,
   said frame member having
   a longitudinally and transversely extending upright configuration seating wall and
   a longitudinally and transversely extending underslung configuration seating wall,
   said seating walls being spaced from one another and connected by integral sidewalls,
   said seating walls adjacent their forward ends having integral opposed concentric circular bearing openings of equal diameter in said seating walls,
   said fork member having an upper cylindrical portion of uniform diameter reversibly receivable within said bearing openings of said seating walls of said frame member,
   an outwardly extending flange beneath said cylindrical portion for supporting the lower of said seating walls of said frame member and
   a projection extending upwardly beyond said cylindrical portion,
   said handlebar member having a central opening for receiving said fork member projection,
   said handlebar member being secured to said fork member overlying the upper of said seating walls of said frame member to interpose said frame member between it and said flange on said fork member.

2. A child's convertible pedal tricycle as claimed in claim 1 wherein
   said front portion and said rear portion of said frame member are at an obtuse angle in elevation.

3. A child's convertible pedal tricycle as claimed in claim 2 wherein
   said bearing openings are oriented relative to said front portion such that said fork member is positioned substantially perpendicular to said front portion in both operating configurations.

4. A child's convertible pedal tricycle as claimed in claim 3 wherein
   said handlebar member has integral grips,
   said grips being substantially perpendicular to said fork member, so that said grips are substantially parallel to said front portion in both operating configurations.

5. A child's convertible pedal tricycle as claimed in claim 1 wherein
   said fork member projecting and said handlebar member opening is of cooperating non-circular cross-section.

6. A child's convertible pedal tricycle as claimed in claim 1 wherein
   said handlebar member is of integral hollow plastic with upper and lower spaced walls with integral sidewalls including an integral, inwardly extending flange for receiving said fork member projection.

7. A child's convertible pedal tricycle as claimed in claim 6 wherein
   a fastener is provided for removably attaching said handlebar member to the upper end of said fork member,
   said fork member projection has a perpendicular fastener opening therein,
   said handlebar member flange has a cooperating fastener opening therein and
   said fastener extends through said fork member projection and handlebar member openings.

8. A child's convertible pedal tricycle readily assembled into upright and underslung configurations, comprising
   an integral hollow plastic frame member with
   a transversely narrow front portion and
   a transversely wide rear portion longitudinally spaced from said front portion and in rigid and fixed angular relation thereto and having a pair of rear wheels rotatably mounted on opposite sides of the rear end of said rear portion, a front fork member removably, reversibly and rotatably mounted on said frame member with a pedal driven front wheel rotatably mounted on the lower end thereof and a handlebar member removably mounted on said front fork member, said frame member having a longitudinally and transversely extending upright configuration seating wall and a longitudinally and transversely extending underslung configuration seating wall said seating walls being spaced from one another and connected by integral sidewalls, said seating walls adjacent their forward ends having integral opposed concentric circular bearing openings of equal diameter defined by integral inturned curved flanges in said seating walls, the forward portion of said upright configuration seating wall being generally horizontal in the upright configuration of the assembled tricycle and having an integral saddle adjacent the rear end of said forward portion of said upright configuration wall and the back portion of said underslung configuration seating wall being generally horizontal in the underslung configuration of the asembled tricycle and having an integral seat adjacent the rear end of said back portion of said underslung configuration seating wall, said fork member having an upper cylindrical portion of uniform diameter reversibly receivable within said bearing openings of said seating walls of said frame member, said handlebar member being secured to said fork member overlying the upper of said seating walls.

9. A child's convertible pedal tricycle as claimed in claim 8 wherein said fork member has an outwardly extending flange beneath said cylindrical portion for supporting the lower of said seating walls of said frame member, said fork member being secured to said handlebar member with the lower surface thereof overlying the upper of said seating walls to interpose said frame member between it and said flange on said fork member.

10. A child's convertible pedal tricycle as claimed in claim 9 further including a fastener for removably attaching said handlebar member to the upper end of said fork member and wherein said fork member has a projection extending upwardly beyond said cylindrical portion having means for receiving said fastener and said handlebar member has a central opening for receiving said fork member projection and a fastener opening concentric with said fork member fastener opening for receiving said fastener.

11. A child's convertible pedal tricycle as claimed in claim 10 wherein said fastener and at least one of said openings is threaded.

12. A child's convertible pedal tricycle readily assembled into upright and underslung configurations, comprising an integral hollow plastic frame member with a transversely narrow front portion and a transversely wide rear portion longitudinally spaced from said front portion and in rigid and fixed angular relation thereto and having a pair of rear wheels rotatably mounted on opposite sides of the rear end of said rear portion, a front fork member removably, reversibly and rotatably mounted on said frame member with a pedal driven front wheel rotatably mounted on the lower end thereof, an integral hollow plastic handlebar member removably mounted on said fork member and a threaded fastener for removably attaching said handlebar member to the upper end of said fork member, said frame member having a longitudinally and transversely extending upright configuration seating wall and a longitudinally and transversely extending underslung configuration seating wall, said seating walls being spaced from one another and connected by integral sidewalls, said seating walls adjacent their forward ends having opposed concentric circular bearing openings of equal diameter defined by integral inturned curved flanges in said seating walls, the forward portion of said upright configuration seating wall being generally horizontal in the upright configuration of the assembled tricycle and having an integral saddle adjacent the rear end of said forward portion of said upright configuration wall and the back portion of said underslung configuration seating wall being generally horizontal in the underslung configuration of the assembled tricycle and having an integral seat with an upturned rear edge adjacent the rear end of said back portion of said underslung configuration seating wall, said fork member having an upper cylindrical portion of uniform diameter reversibly receivable within said bearing openings of said seating walls of said frame member, an outwardly extending flange beneath said cylindrical portion for supporting the lower of said seating walls of said frame member and a non-circular cross section projection extending beyond said cylindrical portion and having a fastener opening for receiving said fastener, said handlebar member having upper and lower spaced walls with integral sidewalls and a non-circular cross section central fork opening including an integral inwardly extending flange for receiving said fork member projection and a fastener opening in said flange and one of said sidewalls perpendicular to said projection concentric with said fork member fastener opening for receiving said fastener, said fastener securing said fork member to said handlebar member with the lower surface thereof overlying the upper of said seating walls to interpose said frame member between it and said flange on said fork member.

13. In a child's convertible pedal tricycle having an integral hollow plastic frame member, an integral hollow front fork member, an integral hollow plastic handlebar member and a threaded fastener for attaching said handlebar member to the upper end of said fork member that improvement comprising:

means for removably mounting said handlebar member on said fork member and for removably, reversibly and rotatably mounting said fork member on said frame member whereby said tricycle may be readily assembled into upright and underslung configurations, wherein said frame member has upper and lower walls vertically spaced from one another and connected by integral sidewalls, said upper and lower walls adjacent their forward ends having integral upper and lower opposed concentric circular bearing openings of equal diameter defined by inturned curved flanges in said walls, said fork member has an upper cylindrical portion of uniform diameter reversibly receivable within said bearing openings, an outwardly extending flange beneath said cylindrical portion for supporting the lower of said walls of said frame member and a non-circular cross section projection extending axially beyond said cylindrical portion, of smaller cross-sectional dimension than said cylindrical portion, and having a fastener opening for receiving said fastener, said handlebar member has upper and lower spaced walls with integral sidewalls and a non-circular cross section central fork opening including an integral inwardly extending flange for receiving said fork member projection and a fastener opening in said flange and one of said sidewalls perpendicular to said projection concentric with said fork member fastener opening for receiving said fastener, said fastener securing said fork member to said handlebar member with the lower surface thereof overlying the upper of said seating walls to interpose said frame member between it and said flange on said fork member.

14. In a child's convertible pedal tricycle as claimed in claim 13 wherein said non-circular cross section projection and central fork opening are of angular cross section.

* * * * *